United States Patent
Jang

(10) Patent No.: US 12,374,691 B2
(45) Date of Patent: Jul. 29, 2025

(54) SODIUM-ION BATTERY CONTAINING A HIGH-CAPACITY GRAPHITIC ANODE AND MANUFACTURING METHOD

(71) Applicant: Global Graphene Group, Inc., Dayton, OH (US)

(72) Inventor: Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 469 days.

(21) Appl. No.: 17/650,969

(22) Filed: Feb. 14, 2022

(65) Prior Publication Data

US 2023/0261190 A1    Aug. 17, 2023

(51) Int. Cl.
| | |
|---|---|
| H01M 4/00 | (2006.01) |
| H01M 4/587 | (2010.01) |
| H01M 10/054 | (2010.01) |
| H01M 4/02 | (2006.01) |

(52) U.S. Cl.
CPC ......... *H01M 4/587* (2013.01); *H01M 10/054* (2013.01); *H01M 2004/027* (2013.01)

(58) Field of Classification Search
CPC .............. H01M 4/587; H01M 10/054; H01M 2004/027; H01M 4/366; H01M 4/60; H01M 4/604; H01M 4/387; H01M 4/386; H01M 10/0525; H01M 4/5825
See application file for complete search history.

(56) References Cited

U.S. PATENT DOCUMENTS

| | | | |
|---|---|---|---|
| 2016/0294000 A1 | 10/2016 | He et al. | |
| 2017/0077546 A1* | 3/2017 | Zhamu | H01M 4/587 |
| 2017/0352869 A1* | 12/2017 | Zhamu | H01M 4/133 |
| 2018/0269478 A1 | 9/2018 | Zhamu et al. | |
| 2019/0379039 A1* | 12/2019 | Zhamu | H01M 4/133 |
| 2021/0351409 A1 | 11/2021 | Lu et al. | |

FOREIGN PATENT DOCUMENTS

| | | | |
|---|---|---|---|
| CN | 112103500 A | 12/2020 | |
| EP | 3905389 A1 * | 11/2021 | C01B 32/00 |

OTHER PUBLICATIONS

Arima et al., Carbonaceous Material for Electrochemical Device, Anode for Electrochemical Device, and Electrochemical Device, Nov. 2021, See the Abstract. (Year: 2021).*
International Patent Application No. PCT/US2023/062582; International Search Report dated Jun. 7, 2023; 3 pages.

* cited by examiner

*Primary Examiner* — Anca Eoff
*Assistant Examiner* — Monique M Wills

(57) ABSTRACT

A rechargeable sodium-ion cell, comprising an anode, a cathode, a separator that electronically isolates the anode from the cathode, and an electrolyte in ionic contact with the anode active and the cathode, wherein the anode comprises a graphite or carbon material having expanded inter-graphene planar spaces with an inter-planar spacing $d_{002}$ from 0.43 nm to 3.0 nm, as measured by X-ray diffraction, and the expanded inter-graphene planar spaces store sodium ions to a specific capacity no less than 150 mAh/g when the cell is in a charged state. Also provided is a method of producing such an anode and sodium-ion cell.

20 Claims, 6 Drawing Sheets

SODIUM-ION BATTERY CONTAINING A HIGH-CAPACITY GRAPHITIC ANODE AND MANUFACTURING METHOD

FIELD

The present disclosure is directed at the anode of a sodium ion battery.

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium-ion batteries. However, lithium is not an abundant element in the earth's crust and lithium is only mined in a very limited number of countries. There is fear for short supply of lithium as the EV industry is rapidly emerging and, hence, the demand for lithium batteries can outpace the supply of lithium.

As a totally distinct class of energy storage device, sodium (Na) batteries have been considered an attractive alternative to lithium batteries since sodium is abundant and the production of sodium is significantly more environmentally benign compared to the production of lithium. In addition, the high cost of lithium is a major issue and Na batteries potentially can be of significantly lower cost.

There are at least two types of batteries that operate on bouncing sodium ions ($Na^+$) back and forth between an anode and a cathode: the sodium metal battery having Na metal or alloy as the anode active material and the sodium-ion battery having a Na intercalation compound as the anode active material. Sodium ion batteries using a hard carbon-based anode active material (a Na intercalation compound) and a sodium transition metal phosphate as a cathode have been described by several research groups; e.g., J. Barker, et al. "Sodium Ion Batteries," U.S. Pat. No. 7,759,008 (Jul. 20, 2010).

However, these sodium-based devices exhibit even lower specific energies and rate capabilities than Li-ion batteries. The anode active materials for Na intercalation and the cathode active materials for Na intercalation have lower Na storage capacities as compared with their Li storage capacities. For instance, hard carbon particles are capable of storing Li ions up to 300-360 mAh/g, but the same materials can store Na ions up to 150-250 mAh/g. Graphite typically stores significantly less than 150 mAh/g of sodium ions (often less than 40 mAh/g) even though graphite can store up to 370 mAh/g of lithium.

Instead of hard carbon or other carbonaceous intercalation compound, sodium metal may be used as the anode active material in a sodium metal cell. However, the use of metallic sodium as the anode active material is normally considered undesirable and dangerous due to the dendrite formation, interface aging, and electrolyte incompatibility problems. Further, sodium is known as a highly explosive substance.

Hence, an object of the present disclosure is to provide a rechargeable sodium-ion battery that exhibits an exceptionally high specific energy or high energy density. One particular technical goal of the present disclosure is to provide a carbon- or graphite-based anode active material having a significantly higher specific capacity.

SUMMARY

The present disclosure provides a rechargeable sodium-ion cell, comprising an anode, a cathode, an optional but desirable separator that electronically isolates the anode from the cathode, and an electrolyte in ionic contact with the anode and the cathode, wherein the anode comprises a graphite or carbon material having expanded inter-graphene planar spaces with an inter-planar spacing $d_{002}$ from 0.43 nm to 3.0 nm, as measured by X-ray diffraction, and the expanded inter-graphene planar spaces store sodium ions to a specific capacity no less than 150 mAh/g when the cell is in a charged state. The expanded inter-graphene planar spaces preferably have an inter-planar spacing $d_{002}$ from 0.50 nm to 2.0 nm. If the electrolyte is a solid-state electrolyte, it can act as a separator and the cell would not need another separator.

The carbon or graphite material in the anode may be selected from meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nano-tubes, carbon nano-fibers, carbon fibers, graphite nano-fibers, graphite fibers, carbonized polymer fibers, or a combination thereof, wherein the carbon or graphite material has an inter-planar spacing $d_{002}$ from 0.27 nm to 0.42 nm prior to a chemical or physical expansion treatment and the inter-planar spacing $d_{002}$ is increased to from 0.43 nm to 3.0 nm after the expansion treatment.

In certain embodiments, the carbon or graphite material is selected from graphite foam or graphene foam having pores and pore walls, wherein the pore walls contain a stack of bonded graphene planes having an expanded inter-planar spacing $d_{002}$ from 0.45 nm to 1.5 nm. Preferably, the stack contains from 2 to 100 graphene planes.

In the disclosed rechargeable sodium-ion cell, the inter-planar spacing $d_{002}$ may be from 0.5 nm to 1.2 nm. Preferably, the inter-planar spacing $d_{002}$ is from 1.2 nm to 2.0 nm.

In some preferred embodiments, the expansion treatment may include an oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation of the graphite or carbon material. These expansion treatments may be further followed by a constrained thermal expansion treatment to increase the d spacing from a more typical range of 0.5-1.2 nm to a range of 1.2-3.0 nm.

The carbon or graphite material may contain a non-carbon element selected from oxygen, fluorine, chlorine, bromine, iodine, nitrogen, hydrogen, or boron.

The present disclosure also provides an anode for a rechargeable sodium-ion cell, wherein the anode comprises a graphite or carbon material having expanded inter-graphene planar spaces with an inter-planar spacing $d_{002}$ from 0.43 nm to 3.0 nm, as measured by X-ray diffraction, and the expanded inter-graphene planar spaces store sodium ions to a specific capacity no less than 150 mAh/g when the cell is in a charged state.

The carbon or graphite material in the anode may be selected from meso-phase pitch, meso-phase carbon, meso carbon micro-beads (MCMB), coke particles, expanded graphite flakes, artificial graphite particles, natural graphite particles, highly oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof, wherein the carbon or graphite material has an inter-planar spacing $d_{002}$ from 0.27 nm to 0.42 nm prior to a chemical or physical expansion treatment and the inter-planar spacing $d_{002}$. is increased to from 0.43 nm to 2.0 nm after the expansion treatment.

In certain embodiments, the carbon or graphite material is selected from graphite foam or graphene foam having pores and pore walls, wherein said pore walls contain a stack of bonded graphene planes having an expanded inter-planar spacing $d_{002}$ from 0.45 nm to 1.5 nm. The stack can contain from 2 to 100 graphene planes.

In the rechargeable sodium-ion cell, the electrolyte may be selected from solid polymer electrolyte, polymer gel electrolyte, composite electrolyte, ionic liquid electrolyte, non-aqueous liquid electrolyte, soft matter phase electrolyte, inorganic solid-state electrolyte, or a combination thereof.

In certain embodiments, the electrolyte contains a salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), Lithium bis(oxalato)borate (Li-BOB), lithium oxalyldifluoroborate ($LiBF_2C_2O_4$), lithium oxalyldifluoroborate ($LiBF_2C_2O_4$), Lithium nitrate ($LiNO_3$), Li-Fluoroalkyl-Phosphates ($LiPF3(CF_2CF_3)_3$), lithium bis-perfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

The solvent in the electrolyte may be selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (7-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

There is no particular restriction on the type of cathode active material that can be implemented in the cathode of the presently disclosed sodium-ion cell. In certain embodiments, the cathode comprises a cathode active material selected from $NaFePO_4$, $Na_{(1-x)}K_xPO_4$, $KFePO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $\lambda\text{-}MnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, NiHCF, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$, y/z=0.01 to 100, Se, sodium polysulfide, sulfur, Alluaudites, or a combination thereof, wherein x is from 0.1 to 1.0.

In some embodiments, the cathode comprises a cathode active material selected from a Na-based layered oxide (e.g., O3-type, P2-type, or P3-type), a polyanionic compound, a mixed polyanionic compound, a sulfate, a pyrophosphate, a Prussian Blue analog, or a combination thereof. In some specific embodiments, the cathode comprises a cathode active material selected from $Na_{0.7}CoO_2$, $Na_{0.67}Ni_{0.25}Mg_{0.1}Mn_{0.65}O_2$, $Na_{0.5}[Ni_{0.23}Fe_{0.13}Mn_{0.63}]O_2$, $Na_{0.85}Li_{0.17}Ni_{0.21}Mn_{0.64}O_2$, Zn doped $Na_{0.833}[Li_{0.25}Mn_{0.75}]O_2$, $Na_{0.7}Mg_{0.05}[Mn_{0.6}Ni_{0.2}Mg_{0.15}]O_2$, $Na_{0.66}Co_{0.5}Mn_{0.5}O_2$, $Na_{2/3}Li_{1/9}Ni_{5/18}Mn_{2/3}O_2$, C-coated $NaCrO_2$, $Na_{0.9}[Cu_{0.22}Fe_{0.30}Mn_{0.48}]O_2$, $Na[Ni_{0.58}Co_{0.06}Mn_{0.36}]O_2$, $Na_{0.75}Ni_{0.82}Co_{0.12}Mn_{0.06}O_2$, $NaMn_{0.48}Ni_{0.2}Fe_{0.3}Mg_{0.02}O_2$, $V_2O_5$ nanosheet, $Na_3V_2(PO_4)_3$, $Na_3V_2(PO_4)_3/C$, $Na_3MnZr(PO_4)_3$, $Na_4Fe_3(PO_4)_2(P_2O_7)$, $Na_3MnTi(PO_4)_3/C$, carbon coated $Na_3V_2(PO_4)_2F_3$, $Na_3(VOPO_4)_2F$, graphene oxide protected $Na_{2+2x}Fe_{2-x}(SO_4)_3$, $Na_{2.3}Cu_{1.1}Mn_2O_{7-d}$, graphene oxide protected $Na_2FeP_2O_7$, graphene oxide protected $Na_{0.81}Fe[Fe(CN)_6]_{0.79-0.61}$, $Na_2CoFe(CN)_6$, $Ni_{0.67}Fe_{0.33}Se_2$, or a combination thereof.

The present disclosure also provides a method of manufacturing a rechargeable sodium-ion cell. The method comprises: (a) providing an anode containing a treated carbon or graphite material having expanded inter-planar spaces having a $d_{002}$ from 0.43 nm to 3.0 nm; (b) providing a cathode; and (c) providing an electrolyte in ionic contact with the anode and the cathode.

In certain embodiments, step (a) comprises submitting a carbon or graphite material to an expansion treatment selected from oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation of the graphite or carbon material. These expansion treatments may be further followed by a constrained thermal expansion treatment to increase the d spacing from a more typical range of 0.5-1.2 nm to a range of 1.2-3.0 nm.

These and other advantages and features of the present invention will become more transparent with the description of the following best mode practice and illustrative examples.

DETAILED DESCRIPTION

Graphite, as the most common anode for commercial lithium-ion batteries, has a long-range-ordered layered structure, and lithium ions can readily electrochemically intercalate tween the graphene layers. The intercalated material has a high theoretical reversible capability of 372 mAh/g and long cycle life. However, for sodium-ion cells, the electrochemical sodiation/desodiation capacity of graphite is found to be <35 mAh/g. The present disclosure provides effective approaches to solving this problem.

Figure 4:
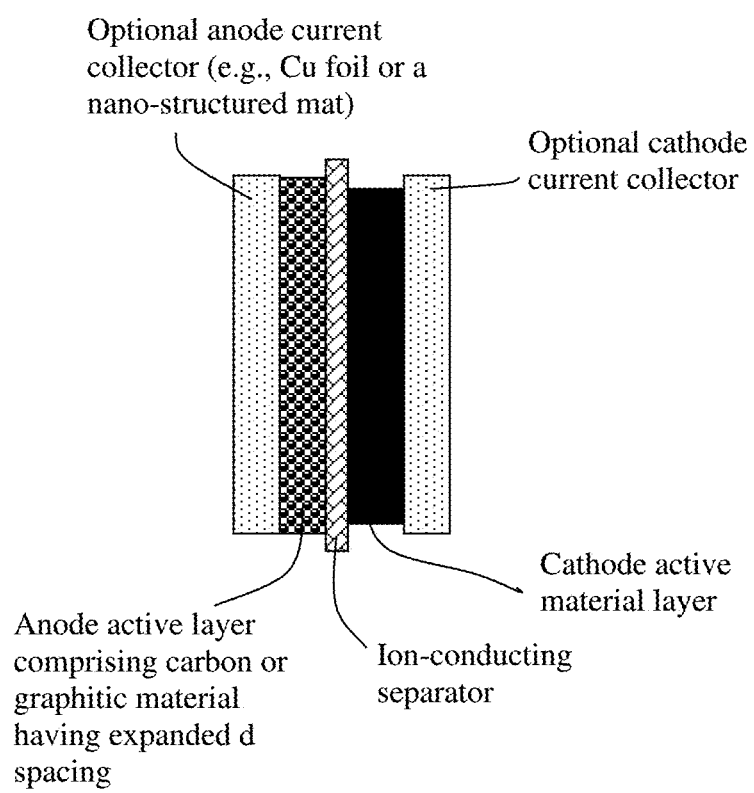
FIG. 4 Schematic of a sodium secondary cell.

The present disclosure provides a rechargeable sodium-ion cell (FIG. 4), comprising an anode, a cathode, a separator that electronically isolates the anode from the cathode, and an electrolyte in ionic contact with the anode active and the cathode, wherein the anode comprises a graphite or carbon material having expanded inter-graphene planar spaces with an inter-planar spacing $d_{002}$ from 0.43 nm to 3.0 nm, as measured by X-ray diffraction, and the expanded inter-graphene planar spaces store sodium ions to a specific capacity no less than 150 mAh/g when the cell is in a charged state. The expanded inter-graphene planar spaces preferably have an inter-planar spacing $d_{002}$ from 0.50 nm to 2.0 nm.

It is important to note at the beginning of this section that a graphite or carbon material having expanded $d_{002}$ spacing between graphene planes (hexagonal carbon atom planes) is not equal or similar to the so-called "expanded graphite" in the graphite industry. Expanded graphite is obtained by breaking up the constituent flakes of exfoliated graphite worms. Expanded graphite typically does not have an expanded $d_{002}$ spacing; instead, its $d_{002}$ spacing typically remains in the range of 0.335 nm-0.36 nm possessed by the original natural or artificial graphite material. This will be further discussed later.

Figure 1A:
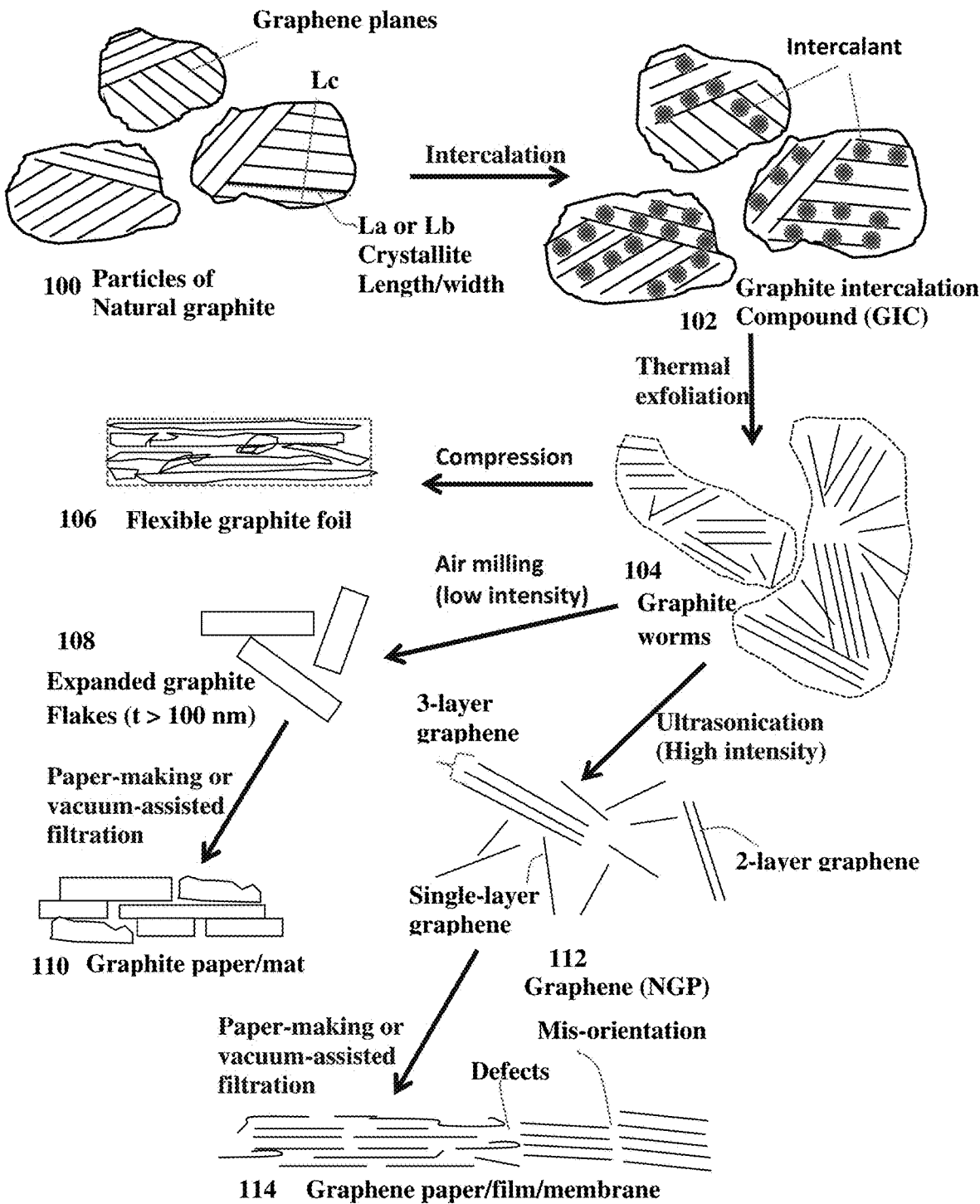
FIG. 1(A) Schematic drawing illustrating the processes for producing intercalated and/or oxidized graphite, subsequently exfoliated graphite worms, and conventional paper, mat, film, and membrane of simply aggregated graphite or graphene flakes/platelets.

As schematically illustrated in the upper portion of FIG. 1(A), bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane or hexagonal carbon atom plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). The inter-graphene plane spacing in a natural graphite material is approximately 0.3354 nm.

Artificial graphite materials also contain constituent graphene planes, but they have an inter-graphene planar spacing, $d_{002}$, typically from 0.32 nm to 0.36 nm (more typically from 0.3339 to 0.3465 nm), as measured by X-ray diffraction. Many carbon or quasi-graphite materials also contain graphite crystals (also referred to as graphite crystallites, domains, or crystal grains) that are each composed of stacked graphene planes. These include meso-carbon mocro-beads (MCMBs), meso-phase carbon, soft carbon (graphitizable), hard carbon (typically non-graphitazable), coke (e.g., needle coke), carbon or graphite fibers (including vapor-grown carbon nano-fibers or graphite nano-fibers), and multi-walled carbon nanotubes (MW-CNT). The spacing between two graphene rings or walls in a MW-CNT is approximately 0.27 to 0.42 nm. The most common spacing values in MW-CNTs are in the range of 0.32-0.35 nm and do not strongly depend on the synthesis method.

It may be noted that the "soft carbon" refers to a carbon material containing graphite domains wherein the orientation of the hexagonal carbon planes (or graphene planes) in one domain and the orientation in neighboring graphite domains are not too mis-matched from each other so that these domains can be readily merged together when heated to a temperature above 2,000° C. (more typically above 2,500° C.). Such a heat treatment is commonly referred to as graphitization. Thus, the soft carbon can be defined as a carbonaceous material that can be graphitized. In contrast, a "hard carbon" can be defined as a carbonaceous material that contain highly mis-oriented graphite domains that cannot be thermally merged together to obtain larger domains; i.e., the hard carbon cannot be graphitized.

The negative electrode (anode), which the instant disclosure provides, is now explained in detail as follows: Carbon materials can assume an essentially amorphous structure (glassy carbon), a highly organized crystal (graphite crystal or crystallite), or a whole range of intermediate structures that are characterized by having various proportions and sizes of graphite crystallites and defects dispersed in an amorphous carbon matrix. Typically, a graphite crystallite is composed of a number of graphene sheets or basal planes (also referred to as a-b planes) that are bonded together through van der Waals forces in the c-axis direction, the direction perpendicular to the basal plane. These graphite crystallites are typically micron- or nanometer-sized in the a- or b-direction (these are called La dimension). The c-directional dimension (or thickness) is commonly referred to as Lc. The interplanar spacing of a perfect graphite is known to be approximately 0.335 nm (3.35 Å). The graphite crystallites are dispersed in or connected by crystal defects or an amorphous phase in a graphite particle, which can be a graphite flake, carbon/graphite fiber segment, carbon/graphite whisker, or carbon/graphite nano-fiber. In the case of a carbon or graphite fiber segment, the graphene plates may be a part of a characteristic "turbostratic" structure.

According to a preferred embodiment of the present disclosure, a negative electrode (anode) material composition for use in a sodium secondary battery may comprise a carbonaceous material that is capable of absorbing and desorbing sodium ions. This carbonaceous material comprises a graphite crystal structure having an interplanar spacing $d_{002}$ of greater than 0.430 nm (preferably from 0.43 nm to 3.0 nm), which is derived from a measured (002) reflection peak in powder X-ray diffraction. This interplanar spacing, also referred to as inter-layer or inter-graphene spacing (C/2 in a graphite unit cell structure), is preferably at least 0.55 nm and most preferably greater than 0.6 nm. Such an expanded interstitial space is substantially permanent as a result of a chemical treatment to a graphite crystal-containing material, such as natural graphite. This is as opposed to most of the intercalation treatments to form a graphite intercalation compound (GIC), in which the inter-planar placing restores to approximately the original magnitude once the intercalant species in the graphite intercalation compound are removed. Conventional GICs are prepared primarily for the purpose of producing flexible graphite through exfoliation of GICs.

A preferred embodiment of the present disclosure is a carbonaceous material composition, referred to as graphite fluoride (GF) with a chemical formula $[CF_x]_n$, where $0.5 \leq x \leq 1.0$. This chemical substance comprises the lamellar structure of carbon atoms in a graphite lattice with atoms of fluorine interposed between the graphene planes. However, GF differs from fluorine-intercalated graphite in several respects. For one, the fluorine is not easily removed from the graphite fluoride by simple heating to temperatures at which the intercalated product would freely release its intercalate. Typically, the intercalated product will freely release most of the fluorine intercalate at temperatures in the range of 350° C. to 400° C. The commonly produced graphite fluoride is thought to be a mixture of two different compounds. $[CF]_n$ and $[C_2F]_n$ having interplanar spacings of 5.8-5.9 Å (0.58-0.59 nm) and 8.8-9.0 Å, respectively. Depending upon the preparation conditions, the average interplanar spacing of a GF sample can vary between these two values. The fluorine atoms in graphite fluoride are covalently bonded to the carbon atoms, not just residing in the interstitial spaces as is true in fluorine-intercalated graphite. The fluorine-intercalated product has a higher conductivity than does the pristine graphite from which it is made. In contrast, graphite fluoride has a conductivity that is lower than that of the pristine graphite from which it is made.

Figure 2:
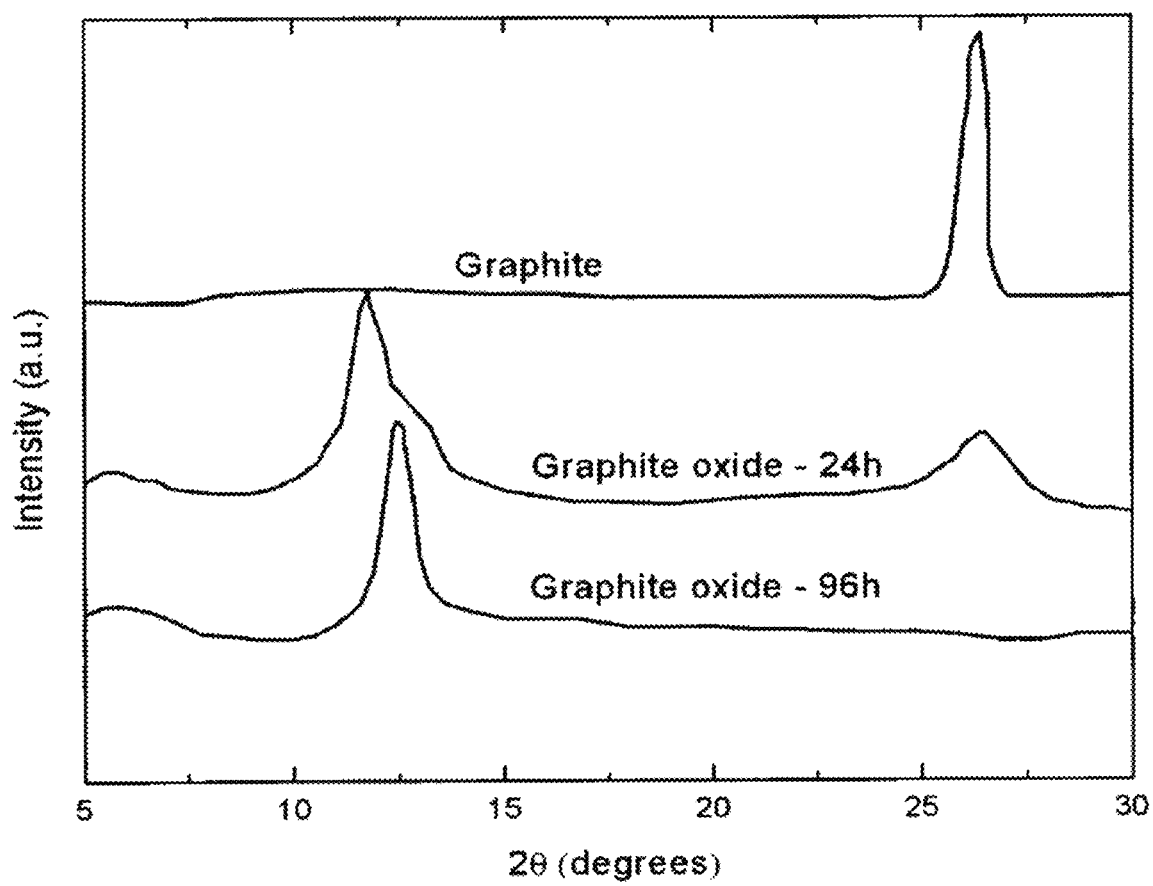
FIG. 2 X-ray diffraction curves for natural graphite and graphite oxide samples, indicating the shift of a (002) plane-induced peak from an interplanar spacing of 0.335 nm for pristine graphite to 0.65-0.75 nm for deeply oxidized graphite.

In one preferred embodiment, the carbonaceous material comprises a material derived from natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or polymeric carbon. For instance, natural flake graphite may be subjected to a deep oxidation treatment under a condition comparable to what has been commonly employed to prepare the so-called expandable graphite or stable graphite intercalation compound, but with a higher degree of oxidation. This can be accomplished by immersing graphite powder in a solution of sulfuric acid, nitric acid or nitrate, and potassium permanganate for preferably 1-24 hours. The resulting acid-intercalated graphite compound is then subjected to vigorous washing and rinsing to remove essentially all the intercalants. The subsequently dried product is a heavily oxidized graphite powder, which comprises graphite oxide. Powder X-ray diffraction (e.g., FIG. 2) indicates that the interplanar spacing is typically between 0.55 and 0.75 nm. These expanded interplanar spacings provide interstitial spaces that are ideal locations to accommodate sodium ions or atoms. They appear to be large enough to accommodate at least two "layers" of sodium, as opposed to just one layer of sodium atoms in a conventional interstitial space (0.27 nm) with an interplanar spacing of typically 0.335 nm.

The carbonaceous material may be derived from particles or flakes of natural graphite, synthetic graphite, highly oriented pyrolytic graphite, graphite fiber, carbon fiber, carbon nano-fiber, graphitic nano-fiber, spheroidal graphite or graphite globule, meso-carbon micro-bead (MCMB), meso-phase pitch, graphitic coke, or polymeric carbon. The spheroidal graphite, produced by spheroidizing natural graphite flakes using a special thermo-chemical procedure, is available from several commercial sources. The spheroidal graphite has a basically identical crystalline structure as in natural graphite, having relatively well-ordered crystallites with an interplanar spacing of 0.336 nm. The MCMB is obtained by extracting meso-phase particles out of other less-ordered carbon matrix and then graphitizing the meso-phase particles. They are typically supplied as a highly graphitic form of graphite.

Although both non-graphitic carbon materials or graphitic carbon materials may be employed in practicing the present disclosure, graphitic materials, such as natural graphite, spheroidal natural graphite, meso-carbon microbeads, and carbon fibers (such as mesophase carbon fibers), are preferably used. The carbonaceous material preferably has a numerical particle size (measured by a laser scattering method) that is smaller than about 25 μm, more preferably smaller than about 15 μm, further preferably smaller than about 10 μm, and most preferably smaller than about 6 μm. The smaller particle size reduces lithium diffusion distances and increases rate capability of the anode, which is a factor in preventing lithium plating at the anode. In those instances where the particle is not spherical, the length scale parallel to the direction of lithium diffusion is the figure of merit. Larger particle sized materials may be used if the sodium diffusion coefficient is high.

Meso-phase pitch, graphitic coke, or polymeric carbon may require additional graphitization treatment, typically at a temperature in the range of 1,500 to 3,000° C. to form nano- or micro-crystallites dispersed in an amorphous carbon matrix. Such a blend or composite of graphitic phase (graphite crystallites) is then subjected to the same interstitial space expanding treatment; e.g., via a deep oxidation or fluorination procedure. The effects of this treatment include expanding the interstitial spaces in the graphite crystallites. Further, we speculate that, just like the mild oxidation treatment, the presently invented deep oxidation or fluorination treatment can serve to (1) remove some active sites or defects in graphitic materials, resulting in an improved surface structure and (2) form a dense layer of oxides or fluorides acting as an efficient passivating film. Both effects will significantly reduce the magnitude of irreversible capacity loss after first and subsequent cycles. Thus, preferably, the carbonaceous material comprises graphite oxide or graphite fluoride, or domains of graphite oxide or graphite fluoride in an amorphous carbon matrix.

A graphite material (e.g., natural graphite particle) is typically composed of graphite crystals dispersed in or connected to an amorphous phase, along with other defects. The proportion of the amorphous carbon phase (the disordered content) of a graphite material may be increased in the following manner: Graphite particles (e.g., natural graphite flakes, MCMB particles, or artificially made graphite globules) may be mixed with a resin to form a composite. This composite may be heated to a temperature of typically 500-1,000° C., for a sufficient period of time to convert the resin into a polymeric carbon or an amorphous carbon phase. Hence, in the presently invented negative electrode material composition, the carbonaceous material may further comprise an amorphous carbon phase or polymeric carbon, wherein the graphite particle or a graphite crystal structure therein is dispersed in or bonded by an amorphous carbon phase or polymeric carbon.

Further alternatively, the carbonaceous material may comprise an electrically conductive binder material, wherein the graphite crystal structure is dispersed in or bonded by this conductive binder material. An electrically conductive binder material may be selected from coal tar pitch, petroleum pitch, meso-phase pitch, coke, a pyrolyzed version of pitch or coke, or a conjugate chain polymer (intrinsically conductive polymer such as polythiophene, polypyrrole, or polyaniline.

The spacing between constituent graphene planes of a graphite crystallite in a natural graphite, artificial graphite, and other graphitic carbon materials can be expanded (i.e. the $d_{002}$ spacing being increased from the original range of 0.27-0.42 nm to the range of 0.42-3.0 nm) using several expansion treatment approaches, including oxidation, fluorination, chlorination, bromination, iodization, nitrogenation, intercalation, combined oxidation-intercalation, combined fluorination-intercalation, combined chlorination-intercalation, combined bromination-intercalation, combined iodization-intercalation, or combined nitrogenation-intercalation of the graphite or carbon material.

More specifically, due to the van der Waals forces holding the parallel graphene planes together being relatively weak, natural graphite can be treated so that the spacing between the graphene planes can be increased to provide a marked expansion in the c-axis direction. This results in a graphite material having an expanded spacing, but the laminar character of the hexagonal carbon layers is substantially retained. The inter-planar spacing (also referred to as inter-graphene spacing) of graphite crystallites can be increased (expanded) via several approaches, including oxidation, fluorination, and/or intercalation of graphite. This is schematically illustrated in FIG. 1(D). The presence of an intercalant, oxygen-containing group, or fluorine-containing group serves to increase the spacing between two graphene planes in a graphite crystallite. This inter-planar spacing may be further increased to become 1.2 nm-3.0 nm if the intercalated, oxidized, or fluorinated graphite is exposed to a moderate temperature (e.g., 150-800° C.) under a constant-volume condition. This is herein referred to as a constrained expansion treatment.

In one process, graphite materials having an expanded inter-planar spacing are obtained by intercalating natural graphite particles with a strong acid and/or an oxidizing agent to obtain a graphite intercalation compound (GIC) or graphite oxide (GO), as illustrated in FIG. 1(A). The presence of chemical species or functional groups in the interstitial spaces between graphene planes serves to increase the inter-graphene spacing, $d_{002}$, as determined by X-ray diffraction, thereby significantly reducing the van der Waals forces that otherwise hold graphene planes together along the c-axis direction. The GIC or GO is most often produced by immersing natural graphite powder (100 in FIG. 1(A)) in a mixture of sulfuric acid, nitric acid (an oxidizing agent), and another oxidizing agent (e.g., potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water.

Water may be removed from the suspension to obtain "expandable graphite," which is essentially a mass of dried GIC or dried graphite oxide particles. The inter-graphene spacing, $d_{002}$, in the dried GIC or graphite oxide particles is typically in the range of 0.42-2.0 nm, more typically in the range of 0.5-1.2 nm. It may be noted than the "expandable graphite" is not "expanded graphite" (to be further explained later).

Figure 1B:
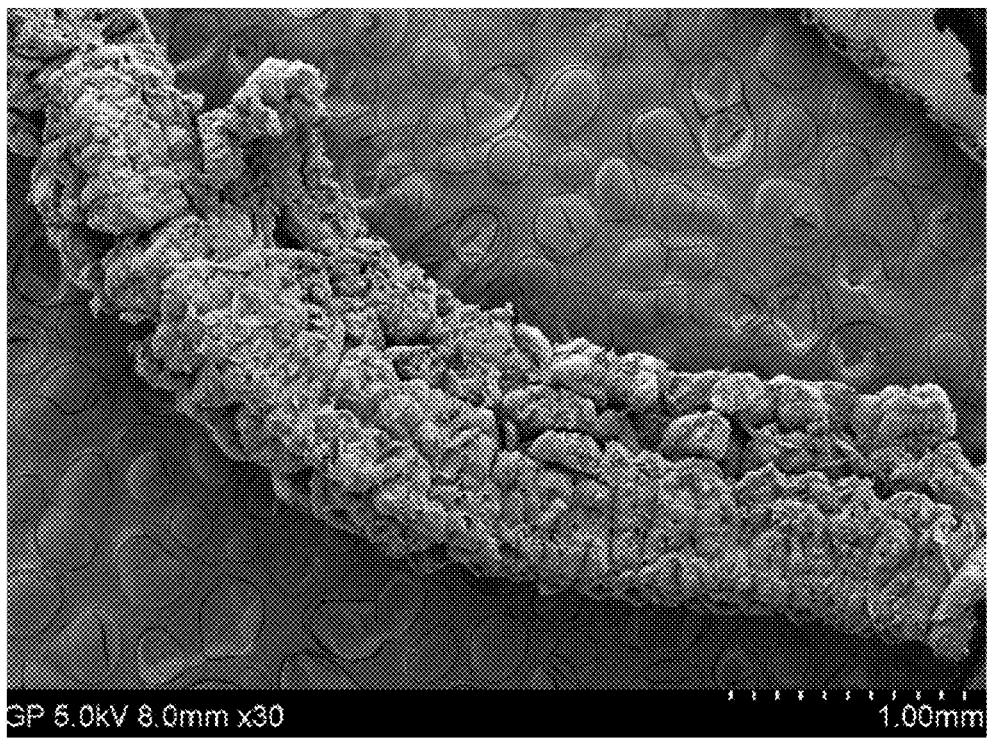
FIG. 1(B) An SEM image of graphite worms.
Figure 1C:
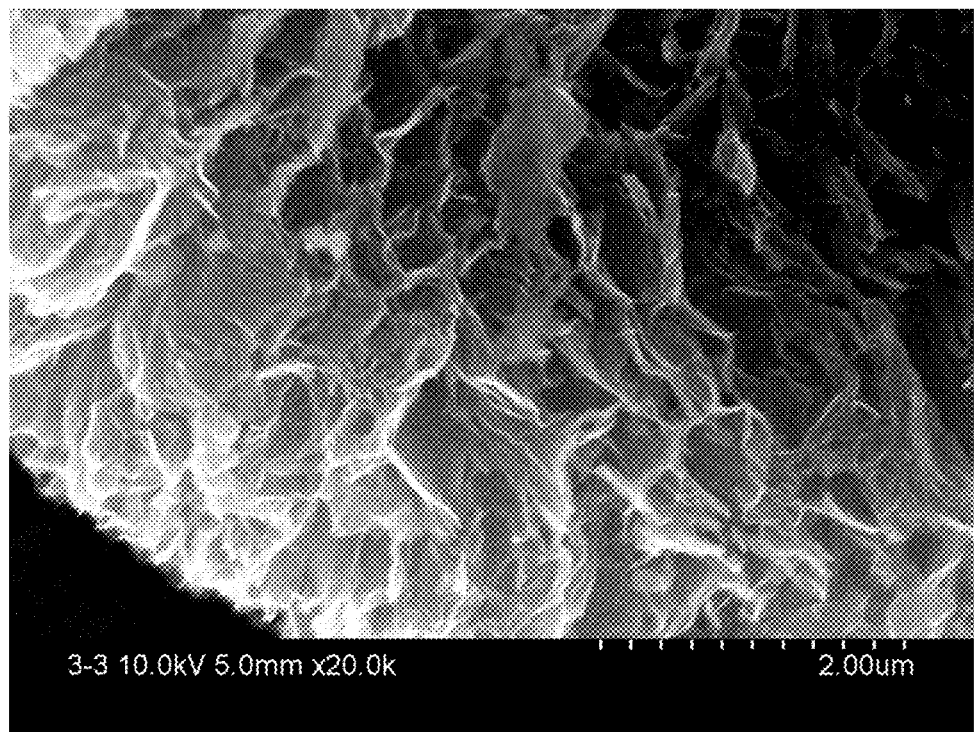
FIG. 1(C) Another SEM image of graphite worms.
Figure 1D:
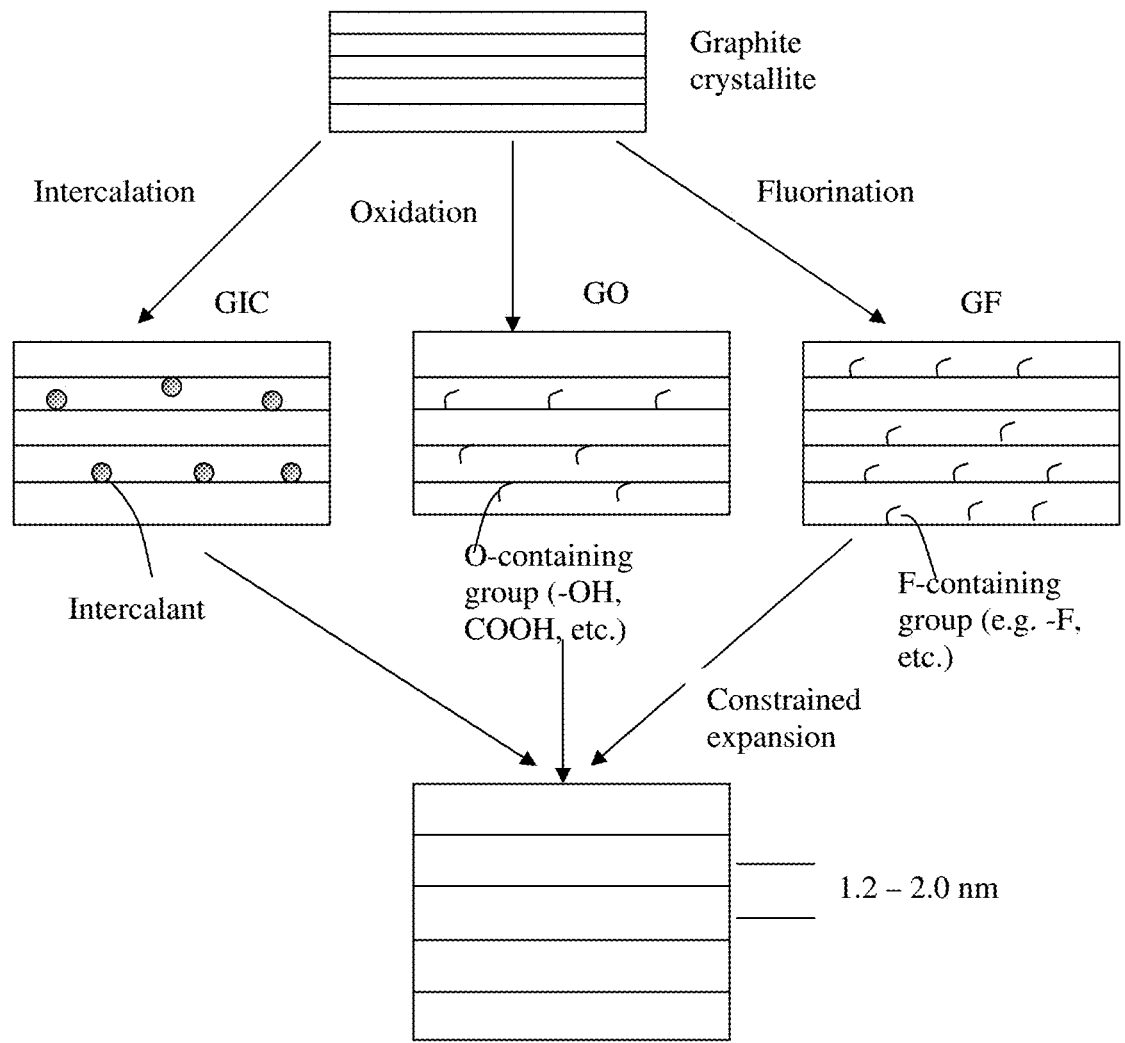
FIG. 1(D) Schematic drawing illustrating the approaches of producing graphite structures containing expanded inter-planar spaces.

Upon exposure of expandable graphite to a temperature in the range of typically 800-1,050° C. for approximately 30 seconds to 2 minutes, the GIC undergoes a rapid volume expansion by a factor of 30-300 to form "exfoliated graphite" or "graphite worms" (104), Graphite worms are each a collection of exfoliated, but largely un-separated graphite flakes that remain interconnected (FIGS. 1(B) and 1(C)). In exfoliated graphite, individual graphite flakes (each containing 1 to several hundred of graphene planes stacked together) are highly spaced from one another, having a spacing of typically 3.0 nm-200 µm. However, they remain physically interconnected, forming an accordion or worm-like structure.

In graphite industry, graphite worms can be re-compressed to obtain flexible graphite sheets or foils (106) that typically have a thickness in the range of 0.1 mm (100 µm)-0.5 mm (500 µm).

Alternatively, in graphite industry, one may choose to use a low-intensity air mill or shearing machine to simply break up the graphite worms for the purpose of producing the so-called "expanded graphite" flakes (108) which contain mostly graphite flakes or platelets thicker than 100 nm (hence, not a nano material by definition). It is clear that the "expanded graphite" is not "expandable graphite" and is not "exfoliated graphite worm" either. Rather, the "expandable graphite" can be thermally exfoliated to obtain "graphite worms," which, in turn, can be subjected to mechanical shearing to break up the otherwise interconnected graphite flakes to obtain "expanded graphite" flakes. These expanded graphite flakes do not have expanded $d_{002}$ spacing. Their $d_{002}$ spacing remains to be in the range of 0.335-0.36 nm, identical or similar to those of the original graphite.

Alternatively, the exfoliated graphite or graphite worms may be subjected to high-intensity mechanical shearing (e.g., using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814. Single-layer graphene can be as thin as 0.34 nm, while multi-layer graphene can have a thickness up to 100 nm, but more typically less than 3 nm (commonly referred to as few-layer graphene). Multiple graphene sheets or platelets may be made into a sheet of NGP paper (114) using a paper-making process.

In GIC or graphite oxide, the inter-graphene plane separation bas been increased from 0.3354 nm in natural graphite to 0.5-1.2 nm in highly oxidized graphite oxide, significantly weakening the van der Waals forces that hold neighboring planes together. Graphite oxide can have an oxygen content of 2%-50% by weight, more typically 20%-40% by weight. GIC or graphite oxide may be subjected to a special treatment herein referred to as "constrained thermal expansion". If GIC or graphite oxide is exposed to a thermal shock in a furnace (e.g., at 800-1,050° C.) and allowed to freely expand, the final product is exfoliated graphite worms. However, if the mass of GIC or graphite oxide is subjected to a constrained condition (e.g., being confined in an autoclave under a constant volume condition or under a uniaxial compression in a mold) while being heated at a temperature from 150° C. to 800° C. (more typically from 300° C. to 600°), the extent of expansion can be constrained and the product can have inter-planar spaces from 1.0 nm to 3.0 nm, or from 1.2 nm to 2.0 nm.

It may be noted that the "expandable graphite" or graphite with expanded inter-planar spacing may also be obtained by forming graphite fluoride (GF), instead of GO. Interaction of $F_2$ with graphite in a fluorine gas at high temperature leads to covalent graphite fluorides, from $(CF)_n$ to $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)$n only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents (e.g. mixtures of $F_2$ with $Br_2$, $Cl_2$, or $I_2$) may be used, although most of the available literature involves fluorination with $F_2$ gas, sometimes in presence of fluorides.

We have observed that lightly fluorinated graphite, $C_xF$ ($2 \leq x \leq 24$), obtained from electrochemical fluorination, typically has an inter-graphene spacing ($d_{002}$) less than 0.37 nm, more typically <0.35 nm. Only when x in $C_xF$ is less than 2 (i.e., $0.5 \leq x < 2$) can one observe a $d_{002}$ spacing greater than 0.5 nm (in fluorinated graphite produced by a gaseous phase fluorination or chemical fluorination procedure). When x in $C_xF$ is less than 1.33 (i.e., $0.5 \leq x < 1.33$) one can observe a $d_{002}$ spacing greater than 0.6 nm. This heavily fluorinated graphite is obtained by fluorination at a high temperature (>>200° C.) for a sufficiently long time, preferably under a pressure >1 atm, and more preferably >3 atm. For reasons remaining unclear, electrochemical fluorination of graphite leads to a product having a d spacing less than 0.4 nm even though the product $C_xF$ has an x value from 1 to 2. It is possible that F atoms electrochemically introduced into graphite tend to reside in defects, such as grain boundaries, instead of between graphene planes and, consequently, do not act to expand the inter-graphene planar spacing.

The nitrogenation of graphite can be conducted by exposing a graphite oxide material to ammonia at high temperatures (200-400° C.). Nitrogenation may also be conducted at lower temperatures by a hydrothermal method; e.g., by sealing GO and ammonia in an autoclave and then increased the temperature to 150-250° C.

In addition to N, O, F, Br, Cl, or H, the presence of other chemical species (e.g., Na, Li, K, Ce, Ca, Fe, $NH_4$, etc.) between graphene planes can also serve to expand the inter-planar spacing, creating room to accommodate electrochemically active materials therein. The expanded interstitial spaces between graphene planes (hexagonal carbon planes or basal planes) are found by us in this study to be surprisingly capable of accommodating $Al^{+3}$ ions and other anions (derived from electrolyte ingredients) as well. It may be noted that graphite can electrochemically intercalated with such chemical species as Na, Li, K, Ce, Ca, $NH_4$, or their combinations, which can then be chemically or electrochemically ion-exchanged with metal elements (Bi, Fe, Co, Mn, Ni, Cu, etc.). All these chemical species can serve to expand the inter-planar spacing.

In addition to natural graphite and artificial graphite, there is a broad array of carbonaceous materials, such as a soft carbon, hard carbon, meso-phase carbon, coke (e.g., needle coke), carbonized pitch, carbon black, activated carbon, or partially graphitized carbon (commonly referred to as the disordered carbon materials) can be subjected to similar expansion treatments to obtain a carbon material having expanded spaces. A disordered carbon material is typically formed of two phases wherein a first phase is small graphite crystal(s) or small stack(s) of graphite planes (with typically up to 10 graphite planes or aromatic ring structures overlapped together to form a small ordered domain) and a second phase is non-crystalline carbon, and wherein the first phase is dispersed in the second phase or bonded by the second phase. The second phase is made up of mostly smaller molecules, smaller aromatic rings, defects, and amorphous carbon. Typically, the disordered carbon is highly porous (e.g., exfoliated activated carbon), or present in an ultra-fine powder form (e.g. chemically etched carbon black) having nano-scaled features (e.g. having meso-scaled pores and, hence, a high specific surface area).

Soft carbon refers to a carbonaceous material composed of small graphite crystals wherein the orientations of these graphite crystals or stacks of graphene planes inside the material are conducive to further merging of neighboring graphene sheets or further growth of these graphite crystals or graphene stacks using a high-temperature heat treatment. This high temperature treatment is commonly referred to as graphitization and, hence, soft carbon is said to be graphitizable. Hard carbon refers to a carbonaceous material composed of small graphite crystals wherein these graphite crystals or stacks of graphene planes inside the material are not oriented in a favorable direction (e.g. nearly perpendicular to each other) and, hence, are not conducive to further merging of neighboring graphene planes or further growth of these graphite crystals or graphene stacks (i.e., not graphitizable).

Certain grades of petroleum pitch or coal tar pitch may be heat-treated (typically at 250-500° C.) to obtain a liquid crystal-type, optically anisotropic structure commonly referred to as meso-phase. This meso-phase material can be extracted out of the liquid component of the mixture to produce isolated meso-phase particles or spheres, which can be further carbonized and graphitized.

There is no particular restriction on the type of cathode active material that can be implemented in the cathode of the presently disclosed sodium-ion cell. In certain embodiments, the cathode comprises a cathode active material selected from $NaFePO_4$, $Na_{(1-x)}K_xPO_4$, $KFePO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $\lambda\text{-}MnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, $NiHCF$, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$, y/z=0.01 to 100, Se, sodium polysulfide, sulfur, Alluaudites, or a combination thereof, wherein x is from 0.1 to 1.0.

In some embodiments, the cathode comprises a cathode active material selected from a Na-based layered oxide (e.g., O3-type, P2-type, or P3-type), a polyanionic compound, a mixed polyanionic compound, a sulfate, a pyrophosphate, a Prussian Blue analog, or a combination thereof. In some specific embodiments, the cathode comprises a cathode active material selected from $Na_{0.7}CoO_2$, $Na_{0.67}Ni_{0.25}Mg_{0.1}Mn_{0.65}O_2$, $Na_{0.5}[Ni_{0.23}Fe_{0.13}Mn_{0.63}]O_2$, $Na_{0.85}Li_{0.17}Ni_{0.21}Mn_{0.64}O_2$, Zn doped $Na_{0.833}[Li_{0.25}Mn_{0.75}]O_2$, $Na_{0.7}Mg_{0.05}[Mn_{0.6}Ni_{0.2}Mg_{0.15}]O_2$, $Na_{0.66}Co_{0.5}Mn_{0.5}O_2$, $Na_{2/3}Li_{1/9}Ni_{5/18}Mn_{2/3}O_2$, C-coated $NaCrO_2$, $Na_{0.9}[Cu_{0.22}Fe_{0.30}Mn_{0.48}]O_2$, $Na[Ni_{0.58}Co_{0.06}Mn_{0.36}]O_2$, $Na_{0.75}Ni_{0.82}Co_{0.12}Mn_{0.06}O_2$, $NaMn_{0.48}Ni_{0.2}Fe_{0.3}Mg_{0.02}O_2$, $V_2O_5$ nanosheet, $Na_3V_2(PO_4)_3$, $Na_3V_2(PO_4)_3/C$, $Na_3MnZr(PO_4)_3$, $Na_4Fe_3(PO_4)_2(P_2O_7)$, $Na_3MnTi(PO_4)_3/C$, carbon coated $Na_3V_2(PO_4)_2F_3$, $Na_3(VOPO_4)_2F$, graphene oxide protected $Na_{2+2x}Fe_{2-x}(SO_4)_3$, $Na_{2.3}Cu_{1.1}Mn_2O_{7-d}$, graphene oxide protected $Na_2FeP_2O_7$, graphene oxide protected $Na_{0.81}Fe[Fe(CN)_6]_{0.79-0.61}$, $Na_2CoFe(CN)_6$, $Ni_{0.67}Fe_{0.33}Se_2$, or a combination thereof.

The electrolyte may comprise a solvent selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (7-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

The electrolyte may further comprise an alkali metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (Li-BOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bis-perfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$), or a combination thereof.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium [$LiN(CF_3SO_2)_2$], lithium bis(oxalato)borate (Li-BOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF3(CF_2CF_3)_3$), lithium bis-perfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Among them, $LiPF_6$, $LiBF_4$ and $LiN(CF_3SO_2)_2$ are preferred for Li—S cells, $NaPF_6$ and $LiBF_4$ for Na—S cells, and $KBF_4$ for K—S cells. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n-C_3F_7BF_3^-$, $n-C_4F_9BF_3^-$, $PF_6^-$, $CF_3CO_2^-$, $CF_3SO_3$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—S cell.

In one embodiment, the cathode layer may be pre-loaded with up to 30% (preferably <15% and more preferably <10%) of an active material (sulfur or lithium polysulfide) prior to the cathode layer fabrication. In yet another embodiment, the cathode layer can contain a conductive filler, such as carbon black (CB), acetylene black (AB), graphite particles, activated carbon, meso-porous carbon, meso-carbon micro bead (MCMB), carbon nano-tube (CNT), carbon nano-fiber (CNF), carbon fiber, or a combination thereof. These materials (not having expanded d spacing) are for use as a conductive filler, not as a support for S.

The following examples are presented primarily for the purpose of illustrating the best mode practice of the present disclosure and should not be construed as limiting the scope of the present invention.

Example 1: Oxidation of Graphite to Produce Graphite Particles Having Expanded d Spacing Natural flake graphite, nominally sized at 45 m, provided by Asbury Carbons (405 Old Main St., Asbury, N.J. 08802, USA) was milled to reduce the size to approximately 14 m (Sample 1a). The chemicals used in the present study, including fuming nitric acid (>90%), sulfuric acid (95-98%), potassium chlorate (98%), and hydrochloric acid (37%), were purchased from Sigma-Aldrich and used as received. Graphite oxide (GO) samples were prepared according to the following procedure:

Sample 1A: A reaction flask containing a magnetic stir bar was charged with sulfuric acid (176 mL) and nitric acid (90 mL) and cooled by immersion in an ice bath. The acid mixture was stirred and allowed to cool for 15 min, and graphite (10 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 24 hours at room temperature. On completion of the reaction, the mixture was poured into 8 L of deionized water and filtered. The GO was re-dispersed and washed in a 5% solution of HCl to remove sulphate ions. The filtrate was tested intermittently with barium chloride to determine if sulphate ions are present. The HCl washing step was repeated until this test was negative. The GO was then washed repeatedly with deionized water until the pH of the filtrate was neutral. The GO slurry was spray-dried and stored in a vacuum oven at 60° C. until use.

Sample 1B: The same procedure as in Sample 1A was followed, but the reaction time was 48 hours.

Sample 1C: The same procedure as in Sample 1A was followed, but the reaction time was 96 hours.

X-ray diffraction studies showed that after a treatment of 24 hours, a significant proportion of graphite has been transformed into graphite oxide. The peak at $2\theta=26.3$ degrees, corresponding to an inter-planar spacing of 0.335 nm (3.35 Å) for pristine natural graphite was significantly reduced in intensity after a deep oxidation treatment for 24 hours and a peak typically near $2\theta=9$-14 degrees (depending upon degree of oxidation) appeared. In the present study, the curves for treatment times of 48 and 96 hours are essentially identical, showing that essentially all of the graphite crystals have been converted into graphite oxide with an inter-planar spacing of 6.5-7.5 Å (the 26.3 degree peak has totally disappeared and a peak of approximately at $2\theta=11.75$-13.7 degrees appeared).

Example 2: Oxidation and Intercalation of Various Graphitic Carbon and Graphite Materials Samples 2A, 2B, 2C, and 2D were prepared according to the same procedure used for Sample 1B, but the starting graphite materials were pieces of highly oriented pyrolytic graphite (HOPG), graphite fiber, graphitic carbon nano-fiber, and spheroidal graphite, respectively. Their final inter-planar spacings are 6.6 Å, 7.3 Å, 7.3 Å, and 6.6 Å, respectively. Their un-treated counterparts are referred to as Sample 2a, 2b, 2c, and 2d, respectively.

Example 3: Preparation of Graphite Oxide from Natural Graphite and Needle Coke Using a Modified Hummers' Method Graphite oxide (Sample 3A) was prepared by oxidation of natural graphite flakes (original size of 200 mesh, from Huadong Graphite Co., Pingdu, China, milled to approximately 15 .mu.m, referred to as Sample 3a) and needle coke with sulfuric acid, sodium nitrate, and potassium permanganate according to the method of Hummers [U.S. Pat. No. 2,798,878, Jul. 9, 1957]. Anisotropic needle coke has a fully developed needle-shape texture of optical anisotropy. Volatile species of the raw coke was estimated to be around 5 wt. %.

In this example, for every 1 gram of graphite or needle coke, we used a mixture of 22 ml of concentrated sulfuric acid, 2.8 grams of potassium permanganate, and 0.5 grams of sodium nitrate. The graphite flakes were immersed in the mixture solution and the reaction time was approximately one hour at 35° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The interlayer spacing of the resulting laminar graphite oxide was determined by the Debye-Scherrer X-ray technique to be approximately 0.73 nm (7.3 Å).

Example 4: Oxidation of Meso-Carbon Micro-Beads (MCMBs) and Hard Carbon Particles Graphite oxide (Sample 4A) was prepared by oxidation of meso-carbon micro-beads (MCMBs) according to the same procedure used in Example 3. MCMB microbeads (Sample 4a) were supplied by China Steel Chemical Co. Taiwan. This material has a density of about 2.24 g/cm$^3$; a particle size maximum for at least 95% by weight of the particles of 37 microns; median size of about 22.5 microns and an inter-planar distance of about 0.336 nm. After deep oxidation treatment, the inter-planar spacing in the resulting graphite oxide micro-beads is approximately 0.76 nm.

A pitch sample (A-500 from Ashland Chemical Co.) was carbonized in a tube furnace at 900° C. for 2 hours, followed by further carbonization at 1,200° C. for 4 hours to produce hard carbon particles. The hard carbon particles were subjected to the same oxidation treatment of MCMBs. The expanded spaces of the oxidized hard carbon particles are approximately 0.83 nm.

Example 5: Bromination and Fluorination of Carbon Fibers

Graphitized carbon fiber (Sample 5a), having an inter-planar spacing of 3.37 Å (0.337 nm) and a fiber diameter of 10 m was first halogenated with a combination of bromine and iodine at temperatures ranging from 75° C. to 115° C. to form a bromine-iodine intercalation compound of graphite as an intermediate product. The intermediate product was then reacted with fluorine gas at temperatures ranging from 275° C. to 450° C. to form the $CF_y$. The value of y in the $CF_y$ samples was approximately 0.6-0.9. X-ray diffraction curves typically show the co-existence of two peaks corresponding to 0.59 nm and 0.88 nm, respectively. Sample 5A exhibits substantially 0.59 nm peak only and Sample 5B exhibits substantially 0.88 nm peak only.

Example 6: Fluorination of Carbon Fibers

A $CF_{0.68}$ sample obtained in EXAMPLE 5 was exposed at 250° C. and 1 atmosphere to vapors of 1,4-dibromo-2-butene ($BrH_2C-CH=CH-CH_2Br$) for 3 hours. It was found that two-thirds of the fluorine was lost from the graphite fluoride sample. It is speculated that 1,4-dibromo-2-butene actively reacts with graphite fluoride, removing fluorine from the graphite fluoride and forming bonds to carbon atoms in the graphite lattice. The resulting product (Sample 6A) is mixed halogenated graphite, likely a combination of graphite fluoride and graphite bromide. The d spacing was from 0.65 nm to 1.22 nm.

Example 7: Fluorination of Graphite to Increase Inter-Planar Spacing

Natural graphite flakes, a sieve size of 200 to 250 mesh, were heated in vacuum (under less than $10^{-2}$ mmHg) for about 2 hours to remove the residual moisture contained in the graphite. Fluorine gas was introduced into a reactor and the reaction was allowed to proceed at 375° C. for 120 hours while maintaining the fluorine pressure at 200 mmHg. This was based on the procedure suggested by Watanabe, et al. disclosed in U.S. Pat. No. 4,139,474. The powder product obtained was black in color. The fluorine content of the product was measured as follows: The product was burnt according to the oxygen flask combustion method and the fluorine was absorbed into water as hydrogen fluoride. The amount of fluorine was determined by employing a fluorine ion electrode. From the result, we obtained a GF (Sample 7A) having an empirical formula $(CF_{0.75})_n$. X-ray diffraction indicated a major (002) peak at $2\theta=13.5$ degrees, corresponding to an inter-planar spacing of 6.25 Å.

Sample 7B was obtained in a manner similar to that for Sample 7A, but at a reaction temperature of 640° C. for 5 hours. The chemical composition was determined to be $(CF_{0.93})_n$. X-ray diffraction indicated a major (002) peak at $2\theta=9.5$ degrees, corresponding to an inter-planar spacing of 9.2 Å.

Example 8: Preparation of Carbon-Coated GO Particles Subjected to Constrained Expansion Two polymeric carbon-coated GO samples (Samples 8-A and 8-B) were prepared by mixing GO particles (prepared in Example 3 and Example 4, respectively) with a phenol resin to obtain a mixture comprising 20% by volume of phenol resin in each case. The mixture was cured at 200° C. for one hour and then carbonized in an argon atmosphere at a temperature of 500° C. under a constant-volume condition. Then, the carbonized product was ground and milled to obtain particles of 1 to 23 m, with an average diameter of approximately 13 m. The inter-planar spacing was determined to be approximately 0.73 nm and 0.76 nm, respectively, prior to the constrained expansion treatment. After this constrained expansion treatment, the d spacing of the GO particles was increased to 1.27 nm and 1.48 nm, respectively (Samples 8-C and 8-D). In another set of samples, the constrained expansion treatment condition was adjusted so that the d spacing of the GO particles was increased to 2.3 nm and 2.85 nm, respectively (Samples 8-E and 8-F).

Example 9: Preparation of Carbon-Coated GF Particles

Natural flake graphite, milled to an average size of approximately 14 microns, was subjected to the same fluorination treatment as described in Example 7 and determined to be $(CF_{0.75})_n$ (Sample 7B). The resulting powder was subjected to a chemical vapor deposition (CVD) of amorphous carbon according to a procedure suggested by Tanaka, et al., U.S. Pat. No. 5,344,726. A $(CF_{0.75})_n$ sample powder of 50 mg was placed in a quartz tube reactor, and then argon gas and propane gas were supplied from an argon supply line and a propane supply line, respectively. Then, a propane concentration of raw gas was set to 10 mole % by handling needle valves. Flow velocity of the raw gas was set to 12.7 cm/min and an amount of supply of propane was set to 0.05 mol/h. It may be noted that a hydrocarbon or its derivatives other than propane may be used as a raw material. More specifically, an aliphatic hydrocarbon, an aromatic hydrocarbon, an alicyclic hydrocarbon or the like may be used. Further specifically, methane, ethane, butane, benzene, toluene, naphthalene, acetylene, biphenyl and substitution products thereof may be used. The powder was heated by a furnace at approximately 750° C. under a constant-volume condition, whereby propane supplied from a pyrex tube was pyrolytically decomposed with a pyrolysis carbon being deposited on the surface of the graphite fluoride powder. The resulting material was milled to become fine particles of approximately 16.5 microns, which are essentially amorphous carbon-coated GF particles (Sample 9B).

Example 10: Preparation of Graphene Foam Having Pore Walls with Expanded Inter-Planar Spaces In one sample, five grams of the graphite oxide were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The resulting suspension contains GO sheets being suspended in water. A chemical blowing agent (hydrazo dicarbonamide) was added to the suspension just prior to casting.

The resulting suspension was then cast onto a glass surface using a doctor's blade to exert shear stresses, inducing GO sheet orientations. The resulting GO coating films, after removal of liquid, have a thickness that can be varied from approximately 5 to 500 μm (preferably and typically from 10 μm to 50 μm).

For making a graphene foam specimen, the GO coating film was then subjected to heat treatments that typically involve an initial thermal reduction temperature of 80-350° C. for 1-8 hours, followed by heat-treating at a second temperature of 1,500-2,850° C. for 0.5 to 5 hours.

Several pieces of GO-derived graphene foam were subsequently subjected to oxidation treatment to produce GO foam containing graphene pore walls having expanded inter-planar spaces.

Example 11: Preparation of Graphite Foam Having Pore Walls with Expanded Inter-Planar Spaces Pitch powder, granules, or pellets are placed in a aluminum mold with the desired final shape of the foam. Mitsubishi ARA-24 meso-phase pitch was utilized. The sample is evacuated to less than 1 torr and then heated to a temperature approximately 300° C. At this point, the vacuum was released to a nitrogen blanket and then a pressure of up to 1,000 psi was applied. The temperature of the system was then raised to 800° C. This was performed at a rate of 2 degree C./min. The temperature was held for at least 15 minutes to achieve a soak and then the furnace power was turned off and cooled to room temperature at a rate of approximately 1.5 degree C./min with release of pressure at a rate of approximately 2 psi/min. Final foam temperatures were 630° C. and 800° C. During the cooling cycle, pressure is released gradually to atmospheric conditions. The foam was then heat treated to 1050° C. (carbonized) under a nitrogen blanket and then heat treated in separate runs in a graphite crucible to 2500° C. and 2800° C. (graphitized) in Argon. Several pieces of graphite foam were subjected to fluorination to obtain graphite fluoride foam according to the procedure used in Example 7.

Figure 3:
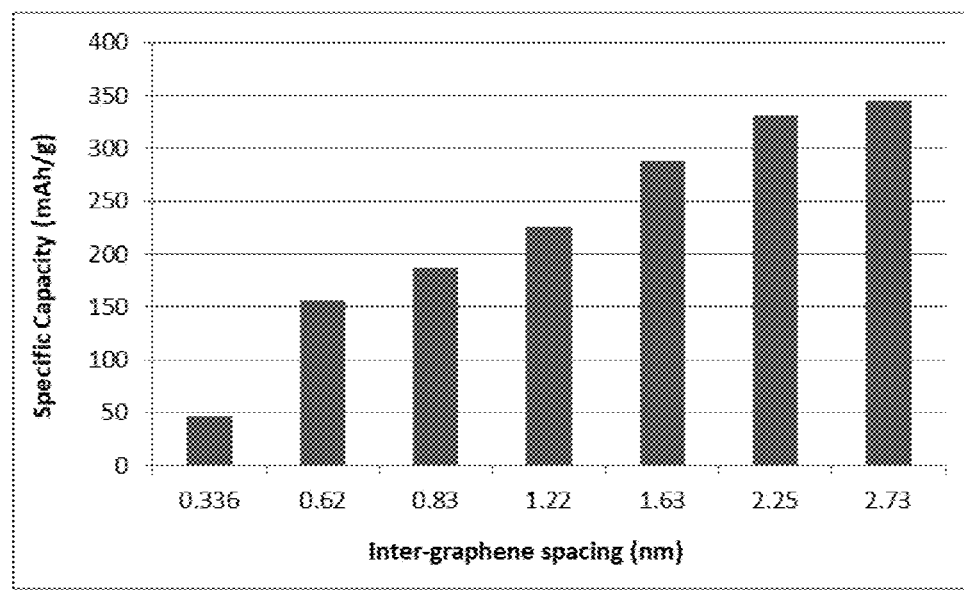
FIG. 3 The specific capacity of artificial graphite-based anode materials for sodium-ion cells plotted as a function of the interplanar spacing.

Our research work has led to the following observations: All the carbon/graphite materials having expanded inter-planar spaces can accommodate a significantly higher amount of lithium ions, typically from 150-345 mAh/g (e.g., FIG. 3). The anode specific capacity is largely proportional to the inter-laminar spacing $d_{002}$. In summary, the present disclosure provides an innovative, versatile, and surprisingly effective platform materials technology that enables the design and manufacture of superior sodium-ion batteries.

The invention claimed is:

1. A rechargeable sodium-ion cell, comprising an anode, a cathode, and
an electrolyte in ionic contact with the anode and the cathode, wherein the anode comprises a graphite or carbon material having expanded inter-graphene planar spaces with an inter-planar spacing $d_{002}$ from 0.43 nm to 3.0 nm, as measured by X-ray diffraction, and the expanded inter-graphene planar spaces store sodium ions to a specific capacity no less than 150 mAh/g when the cell is in a charged state,
wherein said carbon or graphite material contains a non-carbon element selected from fluorine, chlorine, bromine, iodine, nitrogen, hydrogen, or boron.

2. The rechargeable sodium-ion cell of claim 1, wherein the expanded inter-graphene planar spaces have an inter-planar spacing $d_{002}$ from 0.50 nm to 2.0 nm.

3. The rechargeable sodium-ion cell of claim 1, wherein said carbon or graphite material in said anode is selected from meso-phase pitch, meso-phase carbon, meso carbon micro-beads (MCMB), coke particles, expanded graphite flakes, artificial graphite particles, natural graphite particles, oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof, wherein said carbon or graphite material has an inter-planar spacing $d_{002}$ from 0.27 nm to 0.42 nm prior to a chemical or physical expansion treatment and the inter-planar spacing $d_{002}$ is increased to a value from 0.43 nm to 3.0 nm after said expansion treatment.

4. The rechargeable sodium-ion cell of claim 3, wherein said carbon or graphite material is selected from graphite foam or graphene foam having pores and pore walls, wherein said pore walls contain a stack of bonded graphene planes having an expanded inter-planar spacing $d_{002}$ from 0.6 nm to 1.5 nm.

5. The rechargeable sodium-ion cell of claim 4, wherein said stack contains from 2 to 100 graphene planes.

6. The rechargeable sodium-ion cell of claim 1, wherein said inter-planar spacing $d_{002}$ is from 1.2 nm to 2.0 nm.

7. The rechargeable alkali metal-sulfur cell of claim 3, wherein said expansion treatment includes a procedure selected from oxidation, fluorination, bromination, chlorination, nitrogenation, intercalation, combined oxidation-intercalation, combined fluorination-intercalation, combined bromination-intercalation, combined chlorination-intercalation, or combined nitrogenation-intercalation of said graphite or carbon material.

8. An anode for a rechargeable sodium-ion cell, wherein said anode comprises a graphite or carbon material having expanded inter-graphene planar spaces with an inter-planar spacing $d_{002}$ from 0.43 nm to 3.0 nm, as measured by X-ray diffraction, and the expanded inter-graphene planar spaces store sodium ions to a specific capacity no less than 150 mAh/g when the cell is in a charged state;
wherein said carbon or graphite material contains a non-carbon element selected from fluorine, chlorine, bromine, iodine, nitrogen, hydrogen, or boron.

9. The anode of claim 8, wherein said carbon or graphite material in said anode is selected from meso-phase pitch, meso-phase carbon, meso carbon micro-beads (MCMB), coke particles, expanded graphite flakes, artificial graphite particles, natural graphite particles, oriented pyrolytic graphite, soft carbon particles, hard carbon particles, multi-walled carbon nanotubes, carbon nano-fibers, carbon fibers, graphite nano-fibers, graphite fibers, carbonized polymer fibers, or a combination thereof, wherein said carbon or graphite material has an inter-planar spacing $d_{002}$ from 0.27 nm to 0.42 nm prior to a chemical or physical expansion treatment and the inter-planar spacing $d_{002}$ is increased to from 0.43 nm to 2.0 nm after said expansion treatment.

10. The anode of claim 8, wherein said carbon or graphite material is selected from graphite foam or graphene foam having pores and pore walls, wherein said pore walls contain a stack of bonded graphene planes having an expanded inter-planar spacing $d_{002}$ from 0.45 nm to 1.5 nm.

11. The anode of claim 10, wherein said stack contains from 2 to 100 graphene planes.

12. The rechargeable sodium-ion cell of claim 1, wherein said electrolyte is selected from solid polymer electrolyte, polymer gel electrolyte, composite electrolyte, ionic liquid electrolyte, non-aqueous organic liquid electrolyte, soft matter phase electrolyte, inorganic solid-state electrolyte, or a combination thereof.

13. The rechargeable sodium-ion cell of claim 1, wherein said electrolyte contains a salt selected from an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-meta-sulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), a combination thereof, or a combination thereof with lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-meta-sulfonate ($LiCF_3SO_3$), bis-trifluoromethyl sulfonylimide lithium ($LiN(CF_3SO_2)_2$, Lithium bis(oxalato)borate (Li-BOB), lithium oxalyldifluoroborate ($LiBF_2C_2O_4$), lithium oxalyldifluoroborate ($LiBF_2C_2O_4$), Lithium nitrate ($LiNO_3$), Li-Fluoroalkyl-Phosphates ($LiPF3(CF_2CF_3)_3$), or lithium bisperfluoroethysulfonylimide (LiBETI).

14. The rechargeable sodium-ion cell of claim 13, wherein said electrolyte comprises a solvent selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), Poly(ethylene glycol) dimethyl ether (PEGDME), diethylene glycol dibutyl ether (DEGDBE), 2-ethoxyethyl ether (EEE), sulfone, sulfolane, a room temperature ionic liquid, or a combination thereof.

15. The rechargeable sodium-ion cell of claim 1, wherein the cathode comprises a cathode active material selected from $NaFePO_4$, $Na_{(1-x)}K_xPO_4$, $KFePO_4$, $Na_{0.7}FePO_4$, $Na_{1.5}VOPO_4F_{0.5}$, $Na_3V_2(PO_4)_3$, $Na_3V_2(PO_4)_2F_3$, $Na_2FePO_4F$, $NaFeF_3$, $NaVPO_4F$, $KVPO_4F$, $Na_3V_2(PO_4)_2F_3$, $Na_{1.5}VOPO_4F_{0.5}$, $Na_3V_2(PO_4)_3$, $NaV_6O_{15}$, $Na_xVO_2$, $Na_{0.33}V_2O_5$, $Na_xCoO_2$, $Na_{2/3}[Ni_{1/3}Mn_{2/3}]O_2$, $Na_x(Fe_{1/2}Mn_{1/2})O_2$, $Na_xMnO_2$, $\lambda$-$MnO_2$, $Na_xK_{(1-x)}MnO_2$, $Na_{0.44}MnO_2$, $Na_{0.44}MnO_2/C$, $Na_4Mn_9O_{18}$, $NaFe_2Mn(PO_4)_3$, $Na_2Ti_3O_7$, $Ni_{1/3}Mn_{1/3}Co_{1/3}O_2$, $Cu_{0.56}Ni_{0.44}HCF$, NiHCF, $Na_xMnO_2$, $NaCrO_2$, $KCrO_2$, $Na_3Ti_2(PO_4)_3$, $NiCo_2O_4$, $Ni_3S_2/FeS_2$, $Sb_2O_4$, $Na_4Fe(CN)_6/C$, $NaV_{1-x}Cr_xPO_4F$, $Se_zS_y$, y/z=0.01 to 100, Se, sodium polysulfide, sulfur, Alluaudites, or a combination thereof, wherein x is from 0.1 to 1.0.

16. The rechargeable sodium-ion cell of claim 1, wherein the cathode comprises a cathode active material selected from a Na-based layered oxide, a polyanionic compound, a mixed polyanionic compound, a sulfate, a pyrophosphate, a Prussian Blue analog, or a combination thereof.

17. The rechargeable sodium-ion cell of claim 1, wherein the cathode comprises a cathode active material selected from $Na_{0.7}CoO_2$, $Na_{0.67}Ni_{0.25}Mg_{0.1}Mn_{0.65}O_2$, $Na_{0.5}[Ni_{0.23}Fe_{0.13}Mn_{0.63}]O_2$, $Na_{0.85}Li_{0.17}Ni_{0.21}Mn_{0.64}O_2$, Zn doped $Na_{0.33}[Li_{0.25}Mn_{0.75}]O_2$, $Na_{0.7}Mg_{0.05}[Mn_{0.6}Ni_{0.2}Mg_{0.15}]O_2$, $Na_{0.66}Co_{0.5}Mn_{0.5}O_2$, $Na_{2/3}Li_{1/9}Ni_{5/18}Mn_{2/3}O_2$, C-coated $NaCrO_2$, $Na_{0.9}[Cu_{0.22}Fe_{0.30}Mn_{0.48}]O_2$, $Na[Ni_{0.58}Co_{0.06}Mn_{0.36}]O_2$, $Na_{0.75}Ni_{0.82}Co_{0.12}Mn_{0.06}O_2$, $NaMn_{0.48}Ni_{0.2}Fe_{0.3}Mg_{0.20}O_2$, $V_2O_5$ nanosheet, $Na_3V_2(PO_4)_3$, $Na_3V_2(PO_4)_3/C$, $Na_3MnZr(PO_4)_3$, $Na_4Fe_3(PO_4)_2(P_2O_7)$, $Na_3MnTi(PO_4)_3/C$, carbon coated $Na_3V_2(PO_4)_2F_3$, $Na_3(VOPO_4)_2F$, graphene oxide protected $Na_{2+2x}Fe_{2-x}(SO_4)_3$, $Na_{2.3}Cu_{1.1}Mn_2O_{7-d}$, graphene oxide protected $Na_2FeP_2O_7$, graphene oxide protected $Na_{0.81}Fe[Fe(CN)_6]_{0.79-0.61}$, $Na_2CoFe(CN)_6$, $Ni_{0.67}Fe_{0.33}Se_2$, or a combination thereof.

18. The rechargeable sodium-ion cell of claim 1, wherein the cell further includes a separator that electronically isolates the anode from the cathode.

19. A method of manufacturing the rechargeable sodium-ion cell of claim 1, the method comprising: (a) providing an anode containing a treated carbon or graphite material having expanded inter-planar spaces having a $d_{002}$ from 0.43 nm to 3.0 nm; (b) providing a cathode; and (c) providing an electrolyte in ionic contact with the anode and the cathode.

20. The method of claim 19, wherein step (a) comprises submitting a carbon or graphite material to an expansion treatment selected from fluorination, bromination, chlorination, nitrogenation, intercalation, combined oxidation-intercalation, combined fluorination-intercalation, combined bromination-intercalation, combined chlorination-intercalation, or combined nitrogenation-intercalation of the graphite or carbon material.

\* \* \* \* \*